Oct. 19, 1948.  E. FRISCH  2,451,936
PROPULSION DRIVE
Filed Nov. 21, 1946  2 Sheets-Sheet 1
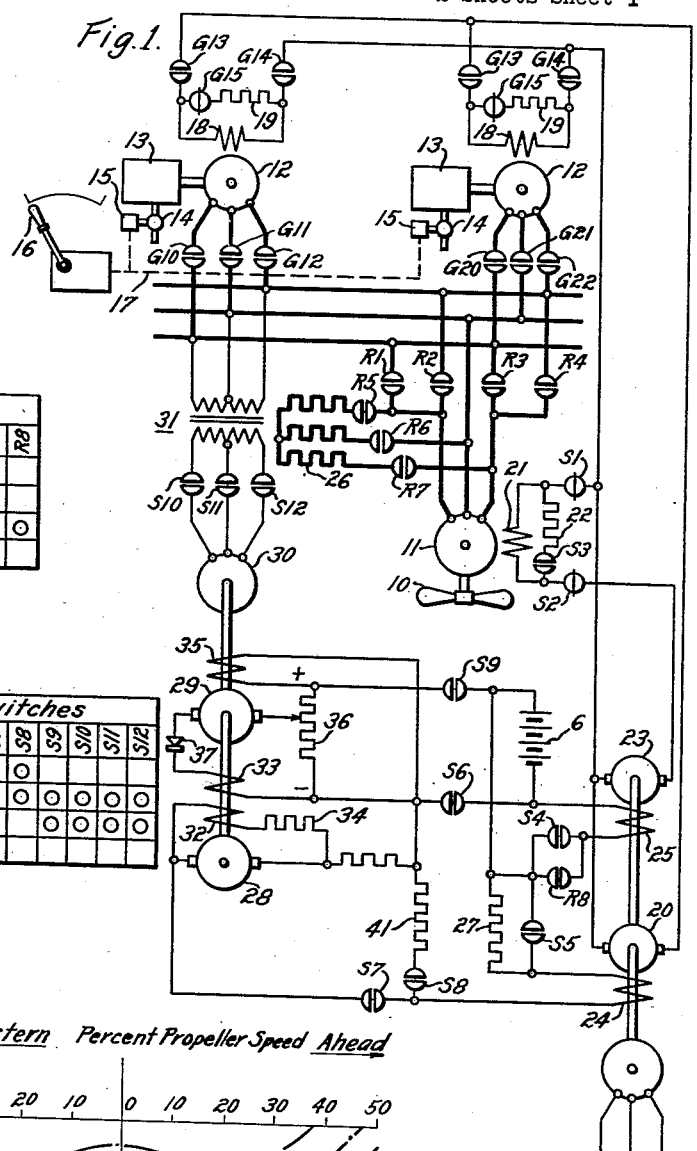
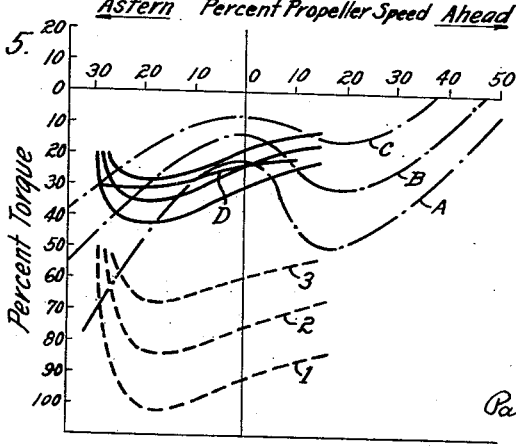
WITNESSES:
Wm. B. Sellers.
W. H. Young
INVENTOR
Erling Frisch.
BY
Paul E. Friedemann
ATTORNEY Patented Oct. 19, 1948

2,451,936

UNITED STATES PATENT OFFICE 2,451,936

PROPULSION DRIVE

Erling Frisch, Pittsburgh, Pa., assignor to Westinghouse Electric Corporation, East Pittsburgh, Pa., a corporation of Pennsylvania Application November 21, 1946, Serial No. 711,404

7 Claims. (Cl. 318—148)

This invention relates to a ship propulsion control system and, more particularly, to an improved arrangement of control apparatus for controlling the operation of a Diesel engine driven alternating-current generator for a synchronous propulsion motor during starting and crash-reversal operations of the ship's propeller by the synchronous motor.

The subject matter of this invention involves an improved arrangement of control apparatus of the type shown and described in the copending application of Erling Frisch and Marion R. Lory, now Patent No. 2,447,643, patented August 28, 1948, application Serial No. 723,760, filed January 23, 1947, as a continuation of application Serial No. 496,730, filed July 30, 1943, now forfeited. In that application there is disclosed an arrangement of control apparatus by which the alternating-current generators for a synchronous propulsion motor are controlled in such manner as to effectively prevent stalling of the Diesel engine's driving alternators. The arrangement of control apparatus referred to provides generally for synchronizing the operation of a plurality of alternating-current generators at a time subsequent to the connection of the synchronous propulsion motors to such generators, and the control of the field excitation for such generators during the time when the propulsion motor is operating at subsynchronous speeds. Reference is made to such application for a more detailed description of the type of control apparatus with which the present invention is involved.

The principal object of this invention is to provide an improved arrangement of apparatus for controlling the field excitation of a Diesel-engine driven alternating-current generator for a synchronous ship propulsion motor during the time that the Diesel engine is operating at low speed.

A further object of this invention is to provide, in control apparatus of the character referred to, a regulating generator for reducing the field excitation of the alternating-current generator which is rendered operable by a pilot generator in response to the speed of operation of the alternating-current generator and Diesel engine when the speed drops below a predetermined speed.

Other objects and advantages of this invention will become apparent during the course of the following description taken in connection with the accompanying drawings, in which:

Figure 1 is a diagrammatic view illustrating the preferred arrangement of apparatus for carrying out the principles of this invention;

Fig. 2 is a switch sequence chart illustrating the sequence in which the connections for the generating apparatus shown to the right of Fig. 2 in Fig. 1 are made;

Fig. 3 is a switch sequence chart illustrating the manner in which the connections for the ship propulsion motor shown to the right of Fig. 3 in Fig. 1 are made;

Fig. 4 is a switch sequence chart illustrating the manner in which the field excitation connections of the field excitation sources of potential are made;

Fig. 5 is a graph illustrating the speed torque conditions of a ship propeller motor and the engine or prime mover during crash reversal operations.

Figure 6:
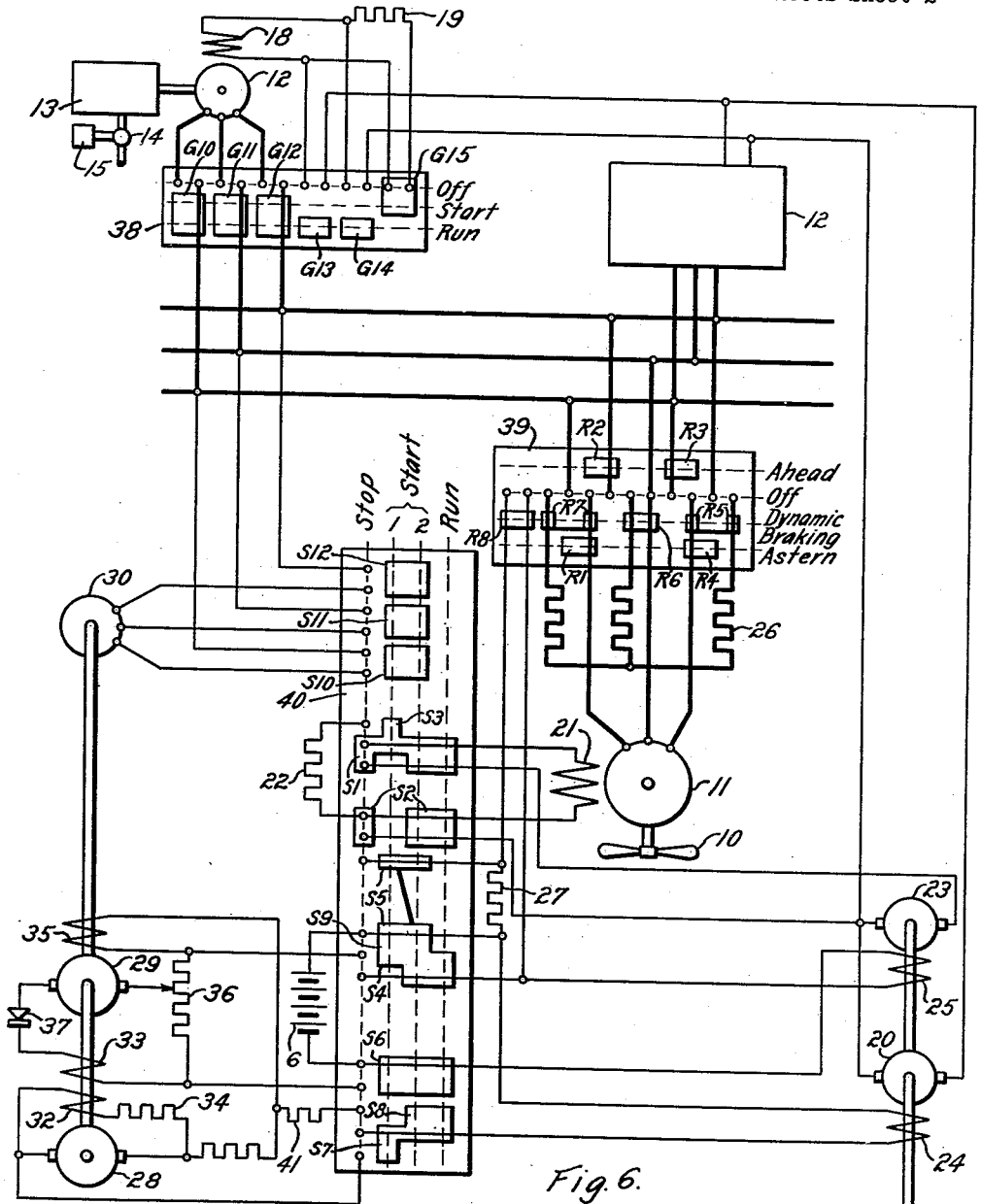
Fig. 6 is a diagrammatic view similar to Fig. 1 but illustrating a form of switching apparatus for carrying out the operations shown in the switch sequence charts of Figs. 2, 3 and 4.

Referring to Fig. 5, the dot-dash lines A, B and C show the torque on the ship's propeller plotted against propeller speed during crash reversal operations for ship speeds respectively of about 100%, of about 80%, and of about 60%. The dotted lines 1, 2 and 3 show the torque which would be placed on the Diesel-drive engines respectively with alternating-current generator excitations of 100%, 85% and 70%. By a 100% alternating-current generator excitation is meant the maximum excitation available which will be in the neighborhood of 250% to about 300% of the normal excitation on such generators when the synchronous motor is operating at synchronous speeds. The solid curves 1, 2 and 3 illustrate the effective torque produced by the synchronous motor for the engine torque curves 1, 2 and 3 shown below. Since crash reversal operations must be made with the Diesel engines running at their lowest speed, which for present Diesel-engine constructions is about 30% of their maximum speed, and at such speed the Diesel engine will develop only in the nature of about 75% of rated torque as indicated by the solid line on the graph, it will be seen from an examination of the engine curves 1, 2 and 3 that the Diesel engine will stall if full excitation is maintained on the alternating-current generators. The difference between the two sets of curves 1, 2 and 3 is due to electrical and other losses between the Diesel engines and the ship propulsion motor. The curve D illustrates the maximum torque that can be developed by the alternating-current generators when the Diesel engines are operating at about 30% speed and developing in the nature of about 75% rated torque. The desired objective of the control apparatus is to get the maximum torque out of the alternating-current generators when the Diesel engines are operating at minimum speed, and this is accomplished by controlling the field excitation of the alternating-current generators so that its conditions of operation will follow that indicated by curve D.

Referring to Fig. 1, the numeral 10 designates a ship's propeller schematically illustrated as being driven by a synchronous motor 11 which is supplied with polyphase alternating current from alternating-current generators 12. Although only two alternating-current generators 12 have been shown in Fig. 1, it will be understood that a greater number may be employed, and in preferred practice there will be provided, generally, four such generators. Each of the generators 12 is driven by a Diesel engine 13, and the speed of such engines is controlled by fuel supply valves 14 which are, in turn regulated by governors 15 in accordance with conventional practice. A master speed control lever 16 is provided for controlling simultaneous operation of the governors 15 through suitable remote control apparatus schematically designated by the broken line 17. Each of the generators 12 is provided with a field winding 18 and a discharge resistor 19. According to the operation of control switches G13, G14 and G15, the field windings 18 may be connected either to their respective discharge resistors 19 or to a source of direct-current potential supplied by the direct-current generator 20. The generators 12 are also provided with switches G10, G11 and G12 for controlling their connection to the motor supply bus.

The motor 11 is provided with a field winding 21 and a starting resistor 22. According to the operation of control switches S1, S2 and S3, the field winding 21 may be connected either to the starting resistor 22 or to a source of direct-current potential supplied by the direct-current generator 23.

The direct-current generators 20 and 23 are, respectively provided with control field windings 24 and 25, the excitation of which is controlled in a manner to be described. The energization of the generator field windings 18 and the motor field winding 21 is dependent upon the control operation of the field windings 24 and 25, respectively, and it is to this control operation which the subject matter of this invention relates.

Reversing switches R1 through R4 control the connection of the propulsion motor 11 to the alternating-current generators 12. The switches R5 through R7 control the connection of the motor 11 to a bank of dynamic braking resistors 26.

As pointed out in the above-mentioned application, the alternating-current generators 12 are started by the Diesel engines 13, and when they are running at approximately the same speed, switches G10 through G12 are closed. The motor switches R1 through R4 are then operated to connect the motor 11 according to the direction of operation desired. At or subsequent to the time the switches R1 through R4 are operated, the switches G15 are opened, and the switches G13 and G14 are closed. This latter operation applies excitation to the fields 18, and the time lag in the building up of the strength of such field prevents a sudden application of load to the engines 13 which would otherwise stall the engines 13. At this time the field 21 for the motor 11 is connected to the starting resistor 22 through closure of the switch S3. The motor 11 then starts up as an induction motor, and the torque it develops is dependent upon the damper windings with which it is provided and the value of the starting resistor 22. It is, of course, desirable that the speed of the motor 11 be increased as rapidly as possible to the point at which the switch S3 may be opened, and the switches S1 and S2 closed to energize the field 21 and synchronize the operation of the motor 11. This is accomplished by regulating the strength of the field windings 18 so that the motor 11 will develop its maximum torque during such time as it is operating as an induction motor. While operating in this manner, it is necessary that the strength of the field 18 be so regulated that it will not overload the Diesel engine 13 and thus cause stalling. The operation that takes place during starting of the motor 11 is the same as takes place during crash-reversal operations except that in the latter case the switches R5 and R7 are first operated to brake the motor 11 and propeller 10 to a standstill position in as short a time as possible. In both cases, it is desirable to utilize the maximum torque of which the Diesel engines 13 are capable while running at low speeds by maintaining the strength of the field windings 18 at a maximum. In this manner, the period during which it is necessary to operate the motor 11 as an induction motor will be reduced to a minimum. Operation of the motor 11 as an induction motor for an excessive period of time may result in damage to the heavy damper windings with which it is provided to develop starting torque, and if the strength of the fields 18 is not maintained at a maximum, the motor 11 will not get up to a speed at which it may be synchronized.

The manner in which the strength of field windings 18 is controlled will now be described. As pointed out above, the strength of the control field winding 18 is regulated through control of the field winding 24 which regulates the output of the exciter generator 20. Normal excitation for the control field winding 24, and also the field winding 25, is provided by a source of constant value direct-current potential, such as the battery 6. The switches S4 and S5, in cooperation with the switch R8 and a voltage reducing resistor 27, provide the connections of the windings 24 and 25 to the source of potential 6. Regulation of the excitation of the control field windings 24 is effected by a regulating generator 28 and a pilot generator 29 under the control of switches S6 through S12.

The generators 28 and 29 are shown as being mechanically connected to an alternating-current motor 30 which may be connected by the switches S10 through S12 to the secondary of a step-down transformer 31, the primary of which is connected to the output circuit of the alternating-current generators 12. The motor 30 is a squirrel-cage induction motor and will be driven at a speed corresponding to the frequency of the current being generated by the generators 12 and thus will be responsive to the speed of operation of the generators 12 and Diesel engines 13. Since the pilot generator 29 is mechanically connected to the motor 30, it will also be responsive to the speed of operation of the alternating-current generators 12 and Diesel engines 13. The output of the generator 28 is controlled by the pilot generator 29, and this generator may be operated by any constant speed motor instead of being connected to the motor 30, as illustrated.

The generator 28 is provided with a shunt field winding 32 and a control field winding 33. The shunt field winding 32 has a series-connected resistor 34 which is so adjusted that the output of the generator 28 will be zero when the control field winding 33 is unexcited but will build up to a maximum when the control field winding 33 becomes slightly energized.

The control field winding 33 is connected in series with the armature circuit of the pilot generator 29. The generator 29 is provided with a field winding 35 which is excited from a direct-current source 6. The output of the generator 29 is adjustably connected in series opposition to a bias resistor 36. The point of connection to the bias resistor 36 is so selected that the voltage drop between such point and the negative terminal of the bias resistor will be slightly lower than the pilot generator voltage when the Diesel engines are operating at or above a predetermined minimum speed. A rectifier block 37 is provided for preventing flow of current in the armature circuit of the pilot generator 29 under such conditions. Accordingly, the control field 33 will be deenergized when the Diesel engines 13 and alternating-current generators 12 are operated at or above minimum speed. When the speed of the generators 12 drop due to a loading beyond that which the engines 13 are capable of carrying, the output of the pilot generator 29 will be correspondingly reduced, and current will flow through the control field winding 33 in the direction indicated by the arrow. Excitation of the control field winding 33 will cause the field winding 32 to build up, and the output of the generator 28 will be correspondingly increased. This output of the generator 28 will be applied through the switch S7 in opposition to the current flowing in the winding 24 and will reduce the strength of such winding. The output of the exciting generator 20 will be reduced, and the strength of the field winding 18 will be decreased to decrease the loading on the Diesel engines 13. As soon as the Diesel engines 13 speed up in response to the decreased loading, the strength of the field 18 will be automatically increased, and the power developed by the generators 12 will be maintained a maximum for the minimum speed setting of the Diesel engines 13.

The apparatus shown in Fig. 6 is identical to that shown in Fig. 1, and like numerals have been employed to designate like parts. The difference in the showing of Fig. 2 lies in the fact that the switches designated in the sequence charts of Figs. 2, 3 and 4 have been shown as contactors mounted on movable bases 38, 39 and 40. The bases 38, 39 and 40, respectively, carry the switches or contactors designated in Figs. 2, 3 and 4. The contact carrying bases 38, 39 and 40 are provided with connections (not shown) for moving the same to the positions designated, as explained in the above-mentioned application.

The operation of the apparatus will be best understood by referring to Fig. 1 and the sequence charts set forth in Figs. 2, 3 and 4. When starting from rest, the generator switches of Fig. 2 will be in the off position, the motor switches of Fig. 3 will be in the off position, and the motor starting switches of Fig. 4 will be in the stop position. These are the positions of the contact carrying bases 38, 39 and 40 shown in Fig. 6. To start the apparatus, the generator switches of Fig. 2 are moved to the run position in which contactors G10, G11 and G12 close to connect the generator to the motor propulsion bus, G15 opens to disconnect resistor 15, and G13 and G14 closes to connect its field 18 to the excitation bus. The motor switches of Fig. 3 will then be operated to either the ahead or astern position to connect the propulsion motor 11 to its propulsion bus. While these connections are being made, the motor starting switches of Fig. 4 are in the stop position. Upon movement to the start—1 position, switches S1 and S2 open to prevent energization of the field winding 21, and switch S3 closes to connect starting resistor 22 across the field 21. Switches S5 through S7, and S9 through S12 are then closed to energize the control field winding 24 and to render the control provided by the pilot generator 29 and regulating generator 28 operative. Upon movement of the motor starting switches of Fig. 4 to the start—1 position, closure of switches S5, S7 and S6 apply maximum energization to the field winding 24. Closure of the switch S9 applies potential to the field winding 35 and to the bias resistor 36. Operation of switches S10, S11 and S12 will start the motor 30 and make the pilot generator 29 responsive to the speed of the Diesel engines 13 and to the frequency or speed of the generators 12.

With full excitation on the winding 24, there will be maximum excitation of the winding 18, and the output of the generators 12 will be immediately raised to a maximum value. For low speeds of operation of the Diesel engines 13, such loading will be more than the engines 13 can carry. The overloading of the Diesel engines 13 will result in a slowing down that will be immediately detected by the pilot generator 29. The output of the pilot generator 29 will drop, and the field 33 will become energized. As explained above, energization of the control winding 33 will cause the output of the self-excited regulating generator 28 to be raised to a maximum. This action will reduce the field strength provided by the winding 24 and reduce the excitation of the generator winding 18 to a point at which the Diesel engines will return to the operating speed for which they have been set. As their speed is raised, the strength of the field 18 through the operation of the pilot generator 29 and regulating generator 28 will be gradually increased to maintain the output of the alternating-current generators at a maximum value without slowing down of the Diesel engines 13. In this manner the output of the generators 12 is maintained at a maximum value without overloading of the Diesel engines 13 to a point at which they will stall. The danger of stalling the Diesel engines is considerably greater when the ship is being started or stopped by operating the motor 11 from a reduced number of generators 12.

With the motor starting switches in the start—1 position, it will be seen that the control regulation is effective to maintain the output of the generators 12 at a maximum. While in this position, the motor 11 will be operating as an induction motor, and its speed will be gradually increasing until a value is reached at which its field 21 may be energized to cause it to go into synchronous operation. When the speed of the motor 11 reaches a value at which it may be synchronized, such condition will be apparent by a considerable drop in the current being drawn by the motor 11. As soon as the operator notices the change in the current being drawn by the motor 11, the motor starting switches may be moved to the start—2 position. In this position switch S3 opens to disconnect the starting resistor 22, and switches S1 and S2 close to connect the field winding 21 across its exciting generator 23. At the same time, switch S4 closes to connect the winding 25 for the exciter generator 23 to the source of direct-current potential 6. Switch S7 opens to disconnect the regulating generator 28, and switch 8 closes to connect resistor 41 into the circuit of the control field winding 24. The field winding 21 is now energized, and after a slight pause in the start—2 position to allow the motor 11 to synchronize its operation, the operator may move the switches of Fig. 4 to the run position.

In the run position, switches S10, S11 and S12 are open to stop the motor 30. The switch S9 is open to deenergize the pilot generator 29, and switch S5 is open to connect resistor 27 into the circuit of the field winding 24. Connection of the resistor 27 in this manner reduces the excitation of the generator windings 18 to a normal value.

With the ship under way, a reversal of the motor 11 may be had to effect a slowing down of the ship, such as may be necessary to prevent collision with another ship. This is accomplished by first moving the motor starting switches to the stop position. The motor switches of Fig. 3 may then be moved to the dynamic braking position in which the resistances 26 become effective to slow the motor 11 and propeller 10 to a standstill. The switches of Figs. 2, 3 and 4 may then be operated, as explained above, to operate the motor 11 in an opposite direction. During this operation, the torque exerted by the propeller 10 and the friction of the ship's hull in the water will be effective to stop the ship in a short period of time.

Since various changes in this invention may be made without departing from the spirit and scope thereof, it is intended that all matters contained in the foregoing description and shown in the accompanying drawings shall be interpreted as illustrative and not in a limiting sense.

I claim as my invention:

1. An electric ship propulsion system comprising, in combination, a prime mover, an alternating-current generator having an armature connected with said prime mover, a propulsion bus connected with said generator, a propulsion motor connected with said bus, field excitation means for said generator, a regulating generator for said excitation means which is normally inoperative to affect the strength of said field excitation means, and a pilot generator responsive to the speed of operation of said prime mover and operative upon a change in the speed of operation of said prime mover to render said regulating generator operable to regulate the strength of said field excitation means.

2. An electric ship propulsion system comprising, in combination, a prime mover, an alternating-current generator having an armature connected with said prime mover, a propulsion bus connected with said generator, a propulsion motor connected with said bus, field excitation means for said generator, a regulating generator for reducing the strength of said field excitation means, a control field for said generator normally operative when said prime mover is operating at or above a predetermined speed to render said regulating generator inoperative, and a pilot generator responsive to the speed of operation of said prime mover and operative when such speed falls below said predetermined speed to adjust said control field to render said regulating generator operative.

3. An electric ship propulsion system comprising, in combination, a prime mover, an alternating-current generator having an armature connected with said prime mover, a propulsion bus connected with said generator, a propulsion motor connected with said bus, field excitation means for said generator including a control field, a source of potential for energizing said control field, a regulating generator having an output circuit connected in opposition to said source, field control means for said regulating generator including a pilot generator responsive to the speed of operation of said prime mover, said field control means being so arranged that the output of said regulating generator is ineffective to vary the potential of said source when said prime mover is rotating at or above a predetermined speed, said pilot generator being operative through said field control means in response to the speed of said prime mover falling below said predetermined speed to increase the output of said regulating generator and thereby reduce the potential on said control field.

4. An electric ship propulsion system comprising, in combination, a prime mover, an alternating-current generator having an armature connected with said prime mover, a propulsion bus connected with said generator, a propulsion motor connected with said bus, field excitation means for said generator, and regulating means for said field excitation means operative to maintain its strength at a maximum value when said prime mover is operating above a predetermined speed, and to reduce its strength when the speed of said prime mover falls below said predetermined speed, said regulating means comprising a control field, a source of potential for energizing said control field, a regulating generator having an output circuit bucking said source, said field control means for said regulating generator including a pilot generator responsive to the speed of said prime mover and having an output circuit, a control circuit connected in series opposition to said pilot generator output circuit, said pilot generator being effective to prevent energization of said field control means when said prime mover is operating above said predetermined speed and effective at other speeds through said opposed circuits to energize said field control means, energization of said field control means rendering said regulating generator operative to reduce the energization and strength of said field control means.

5. A control system for regulating the speed of an alternating-current generator comprising a control field for said generator, and regulating means for varying the strength of said field and thereby the speed of said generator, said regulating means being operative to maintain the strength of said field at a maximum value when said generator is operating above a predetermined speed, and to reduce its strength when the speed of said generator falls below said predetermined speed, said regulating means comprising a source of potential for energizing said control field, a regulating generator having an output circuit bucking said source, field control means for said regulating generator including a pilot generator responsive to the speed of said alternating-current generator and having an output circuit, and a control circuit connected in series opposition to said pilot generator output circuit, said pilot generator being effective to prevent energization of said field control means when said alternating-current generator is operating above said predetermined speed and effective at other speeds through said opposed circuits to energize said field control means, energization of said field control means rendering said regulating generator operative to reduce the energization and strength of said control field.

6. A control system for regulating the speed of an alternating-current generator comprising a control field for said generator, and regulating means for varying the strength of said field and thereby the speed of said generator comprising a source of potential for energizing said control field, a regulating generator having an output circuit connected in opposition to said source, and field control means for said regulating generator including a pilot generator responsive to the speed of said alternating-current generator, said field control means being so arranged that the output of said regulating generator is ineffective to vary the potential of said source when said alternating-current generator is rotating at or above a predetermined speed, said pilot generator being operative through said field control means in response to the speed of said alternating-current generator falling below said predetermined speed to increase the output of said regulating generator and thereby reduce the potential on said control field.

7. A control system for regulating the speed of an alternating-current generator comprising a control field for said generator, and regulating means for varying the strength of said field and thereby the speed of said generator comprising a regulating generator for said control field which is normally inoperative to affect the strength of said control field, and a pilot generator responsive to the speed of operation of said alternating-current generator and operative upon a change in the speed of said alternating-current generator to render said regulating generator operative to regulate the strength of said control field.

ERLING FRISCH.

REFERENCES CITED

The following references are of record in the file of this patent:

UNITED STATES PATENTS

| Number | Name | Date |
| --- | --- | --- |
| 2,414,539 | Lindbeck | Jan. 21, 1947 |